UNITED STATES PATENT OFFICE 2,000,833

PROCESS FOR THE PRODUCTION OF ZINC

Max Gerhard Freise, Angermund, near Dusseldorf, Germany, assignor to American Lurgi Corporation, New York, N. Y., a corporation of New York No Drawing. Application March 29, 1934, Serial No. 718,087. In Germany April 30, 1932

10 Claims. (Cl. 75—28)

This invention relates to a process for the production of zinc.

The raw materials, such as ores, dross, or oxide dust, used in the production of zinc can be divided, on the one hand, into substances which contain substantially only zinc as recoverable metal, and on the other hand into substances containing, in addition to zinc, recoverable amounts of other metals. Hitherto, the metallurgical treatment of the former raw materials has been chiefly carried out by the muffle process. The materials of the second class were treated either by first distilling the zinc by the muffle process and then smelting the other metals from the residues, or by first smelting the material, for the recovery of the other metals, and transforming the zinc, as free as possible from the other metals, either into high-grade zinc scoria, or into oxide with a high zinc content, from which the metal was then recovered in known manner.

The customary method of dealing with the first group of raw materials is comparatively expensive, since it must be carried out by means of indirect heating, and moreover with muffles, the effective capacity of which is very small in relation to the total cubic capacity of the furnace, and which are highly susceptible to both chemical and mechanical stresses, and also to fluctuations of temperature. Moreover, owing to the peculiar character of the muffle process, it entails losses of metal that are relatively high by comparison with other metallurgical processes. These disadvantages are particularly apparent in the case of zinc oxide dusts, such as result from blowing brass, which dusts are in the state of very fine powder and exceedingly light in the loose condition.

The same considerations relatively to the muffle process apply also to the raw materials of the second category, that is to say, the methods of treating these materials are relatively expensive and accompanied by considerable losses of metal.

These defects are also attendant on the known proposal to reduce material containing lead- and zinc oxides, with reducing carbon and under a layer of slag in a closed electric furnace. The reduced lead forms a lead bath under the layer of slag, so that it can be tapped off from the furnace. For the condensation of the zinc vapours formed during the reduction, chambers are provided in the immediate vicinity of the smelting furnace. Although, by this means, the zinc and lead are recovered separately, in a molten state, this process has, nevertheless, failed in practice, for the foregoing reasons.

Attempts have also been made to conduct the reduction of zinc in such a manner that the metallic zinc is obtained directly in liquid form and can be separated, in that condition, from the reduction residues. The continuously descending charge, consisting of zinc oxide and reducing carbon, is first pre-heated in a vertical muffle and then raised, by means of alternating current, to a temperature at which the zinc does not volatilize at the pressure prevailing in the furnace. The fact that the reduction of the zinc proceeds at this low temperature is attributed to the joint action of the reducing carbon and the alternating current. After the electrical and reducing treatment, the charge is cooled while still in the muffle. On issuing from the latter, the molten metal is separated from the reduction residues in a separate agitation apparatus. Even this process does not eliminate the heavy cost of heating reduction muffles.

The present invention aims at enabling metallic zinc to be produced from raw materials of the first group in a directly heated furnace, by taking care to absorb the reduced zinc in a collecting medium (for example by condensation in a collecting metal) before it has been vaporized out of the charge, the collecting metal being preferably one that alloys with zinc. In addition, a reducing, or at least neutral, atmosphere is maintained in the furnace. In order to prevent the vaporization of the zinc from the charge, it is preferable to arrange that the collecting medium acts on the zinc during, or immediately following the reduction.

If, for example, a metal be employed as the collecting medium, an unexpectedly large portion of the zinc, which, finally, exists in the form of a molten alloy of zinc and collecting metal, or as a mixture, in the furnace, can be tapped off from the latter in a molten state. Any convenient metal capable of alloying with zinc, may, for example, be employed as the collecting medium. Lead has been found particularly suitable for this purpose because, on the one hand, the properties of that metal, or its compounds, are highly suitable for carrying out the hereindescribed process and, on the other hand, it is very easy to recover the zinc from lead-zinc alloys.

The process for treating originating materials containing other metals besides zinc, differs from that described above only in that, when the originating materials already contain sufficient quantities for example of such associated metals as are suitable as collecting metal, such associated metals may be directly employed for that purpose. In such case, the metallic zinc is obtained in the form of a zinc-lead alloy, from which the zinc can be recovered by liquation, distillation or the like, or it may be turned to account, in the form of this alloy, as a preliminary or intermediate alloy, for suitable purposes.

In carrying out the invention, the furnace employed for raw materials of the first category, may for example, be an elongated, directly heated rotary-tube furnace, through which the charge travels either in parallel flow, or in counterflow, to the furnace gases. The zinciferous material is mixed, for example with additions containing lead (metallic lead, lead oxide, oxide material or other lead compounds), together with solid reducing agents such as small coal or coke breeze.

In the front portion of the furnace, the charge is pre-heated and then passes to the reaction zone in which the zinc oxide or other zinc compounds, and also, for example, such of the plumbiferous additions as are not already in the metallic state, are reduced to metal. The reactions proceeding in the charge can be conceived as consisting in that the nascent vapours of the zinc condense in the collecting metal, i. e. in the case under consideration, the lead which has been formed at the same time or has been added. Finally, the resulting alloy separates completely from the non-metallic portions of the charge, which may, for example, be discharged from the furnace in a semi-molten or molten condition. The zinc-lead alloy collects in the deepest point of the furnace and is tapped off therefrom, for example at intervals. It is not possible to recover the whole of the zinc in this alloyed form, a larger or smaller amount of the zinc being volatilized, depending on the draught, temperature and the like prevailing in the furnace, and issuing as vapour from the charge and passing into the furnace gases. These zinc vapours become wholly or partially oxidized, and are collected as dust in the dust collectors. Such dust is either returned to the process, or is turned to account in other ways, such as oxide pigment. Whilst the zinc in the zinc-lead alloy can be recovered, for example by liquation in known manner, the practically zinc-free lead can be returned to the process.

The yield of metallic zinc can be substantially improved by adding to the material to be reduced, substances such as alkali oxide or hydroxide, or suitable alkali- or other salts, which have a lower melting point or which, by reason of other properties, act so that the charge forms a thick pulpy mass soon after entering the furnace, and that the separation of the charge mixture is prevented. In such event, the reducing carbon and such of the other components of the charge as are not reduced to metal, retain approximately their initial relative proportions. The reduction of the zinc and the collecting metal, when this has been added in oxide form, and also the condensation of the zinc, are facilitated, and finally the re-volatilization of the zinc from the recovered zinc alloy is prevented by the charge forming a good protective layer above said alloy.

The success of the hereindescribed process is largely dependent on the conditions prevailing in the furnace, and it is, above all, advantageous that a reducing atmosphere should be maintained in the furnace. Consequently, care must be taken, for example, to prevent excessive draught in the furnace and to constrict the discharge outlet of the furnace as far as practicable. Alternatively, other known means, that may favour the formation of a reducing atmosphere in the furnace and the charge may be employed.

Other means than dissolving it in a metal or the like, may be employed to prevent the reduced zinc from vaporizing out of the charge; for example, by the aid of substances, contained in the charge, which retain the zinc by absorption or adsorption. The carbon, or the components of the charge, for example, may act in this manner. The same object may also be achieved by the simple condensation of the zinc on portions of the charge where the temperature is below the boiling point of zinc, and so on.

The other reducing agents known in the metallurgy of zinc may also be employed for the reduction. The amount of reducing agent added to the originating material is kept fairly large, for example between 30% and 60%, since it has been found that the highest yields of metal are obtained when the amount of reducing agent employed is large.

With regard to the yield, for example of metallic zinc in the form of an alloy, a charge containing 470 kgs. of Sn+Pb+Sb and 270 kgs. of zinc per 1000 kgs., furnished 575 kgs. of an alloy containing 20%=115 kgs. of Zn. In this instance, the yield of zinc, in the form of alloy, was therefore 42%. It may be further increased, for example by raising the proportion of collecting metal in the charge.

Contrary to what might be expected in view of the metallurgical properties of zinc, the invention enables the complete volatilization of the zinc in the nascent state to be prevented to a very large extent, and most of the zinc to be recovered in a metallic state, for example in the form of an alloy.

I claim:—

1. Process for the recovery of metallic zinc from materials which contain oxidic compounds of zinc, comprising heating the zinc containing material with coal in a rotary furnace by direct contact with fire gases, collecting at least the greater part of the reduced zinc in a metal present in the furnace and removing the collected zinc from the furnace mixed with said metal.

2. Process according to claim 1 in which lead is used for collecting the reduced zinc.

3. Process for the recovery of metallic zinc from materials which contain oxidic compounds of zinc comprising heating the zinc containing material with coal in a rotary furnace by direct contact with fire gases, collecting at least the greater part of the reduced zinc in a metal which is volatilized with greater difficulty than zinc, which metal is introduced into the furnace in metallic form, and withdrawing the resulting mixture of zinc and said metal from the furnace.

4. Process for the recovery of metallic zinc from materials which contain oxidic compounds of zinc, comprising heating the zinc containing material with coal and an oxidic compound of another metal which is more difficult to volatilize than zinc, in a rotary furnace by direct contact with fire gases, reducing the oxidic compounds of zinc and said metal, collecting at least the greater part of the reduced zinc in the resulting metal, and withdrawing the collected zinc from the furnace mixed with said metal.

5. Process for the recovery of metallic zinc from materials which contain oxidic compounds of zinc, comprising heating the zinc containing material with coal and a more easily fusible alkali metal compound in a rotary furnace by direct contact with fire gases, collecting at least the greater part of the reduced zinc in a metal present in the furnace and withdrawing the collected zinc from the furnace mixed with said metal.

6. Process for the recovery of metallic zinc from materials which contain oxidic compounds of zinc, comprising heating the zinc containing material with coal, a more easily fusible alkali metal compound and an oxidic compound of another metal which is more difficult to volatilize than zinc, in a rotary furnace by direct contact with fire gases, reducing the oxidic compounds of zinc and said metal, collecting at least the greater part of the reduced zinc in said metal and withdrawing the zinc from the furnace, mixed with said metal.

7. Process for the recovery of metallic zinc from materials which contain oxidic compounds of zinc, comprising heating the zinc containing material with coal in a rotary furnace by direct contact with fire gases while maintaining a reducing atmosphere, collecting at least the greater part of the reduced zinc in a metal present in the furnace and withdrawing the collected zinc from the furnace, mixed with said metal.

8. Process according to claim 1, comprising melting the residue of the charge freed from metal shortly before discharge from the furnace.

9. Process as defined in claim 1 in which zinc is recovered from the mixture thereof with the collecting metal removed from the furnace.

10. Process as defined in claim 1 in which zinc is recovered from the mixture thereof with the collecting metal removed from the furnace and said metal is returned to the process.

MAX GERHARD FREISE.